United States Patent Office 3,371,127
Patented Feb. 27, 1968

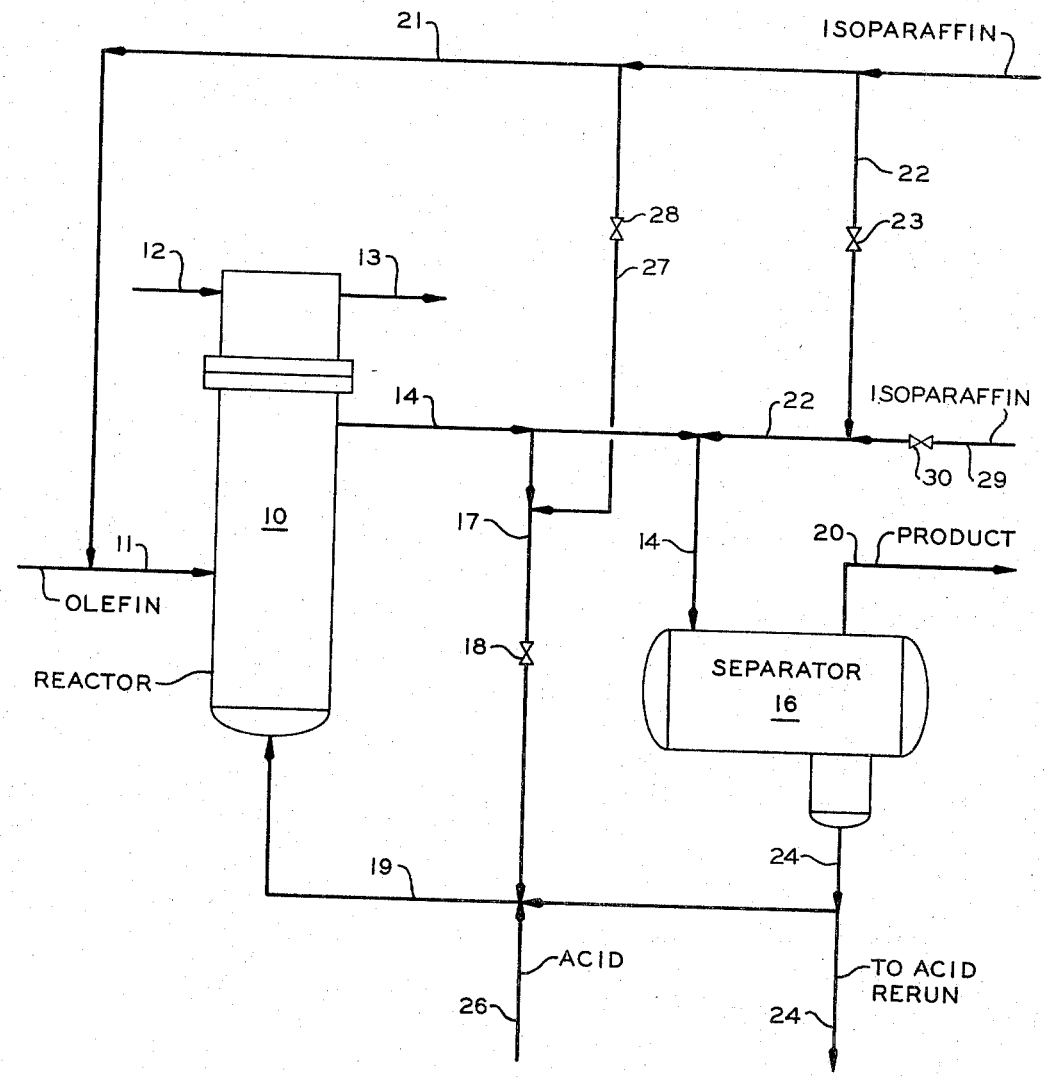

3,371,127
ALKYLATION PROCESS WITH IMPROVEMENT IN PHASE SEPARATION
Eldred J. Cabanaw and Charles C. Chapman, Bartlesville, Okla., assignors to Phillips Petroleum Company, a corporation of Delaware
Filed Jan. 29, 1965, Ser. No. 428,969
2 Claims. (Cl. 260—683.43)

ABSTRACT OF THE DISCLOSURE

In an alkylation process wherein an olefin is alkylated with an isoparaffin in the presence of an acid catalyst, additional isoparaffin is added to the effluent at a temperature higher than the effluent to raise the effluent temperature to at least 120° F. as well as increase the isoparaffin concentration in the settling zone, thereby increasing the ability of the acid phase to separate from the hydrocarbon phase.

---

This invention relates to an improved alkylation process and apparatus therefor. In another aspect, this invention relates to an improved process and apparatus for separating the effluent withdrawn from an acid alkylation zone.

The catalytic alkylation of an olefin with an isoparaffin to form high octane gasoline boiling range products is well known in the art. In a conventional alkylation process, an olefin feed comprising propylene and butylenes is passed with isobutane to an alkylation zone wherein the olefin and isobutane feed are contacted with liquid hydrofluoric acid, said hydrofluoric acid acting as an alkylation catalyst. The alkylation zone hydrocarbon effluent is separated from the acid catalyst and fractionally separated with the isobutane fraction recycled to the alkylation zone.

The separation of the hydrocarbon effluent from the acid catalyst is generally effected by passing an alkylation zone effluent mixture comprising a mixture of hydrocarbons and acid catalyst to a settling zone wherein the hydrocarbon and acid phases are permitted to separate. The hydrocarbon phase is withdrawn from the settling zone and fractionally separated to produce a product alkylate fraction and an isobutane hydrocarbon fraction which is recycled to the alkylation zone. The acid phase is withdrawn from the settling zone and recycled to the alkylation zone. A portion of the acid phase is passed to an acid rerun process wherein undesirable acid soluble oils, water, etc., are separated therefrom. Formed emulsion at the interface of the hydrocarbon and acid phases within the settling zone prevents efficient separation of the alkylation zone effluent into a hydrocarbon phase and an acid phase in a desired minimum residence time within the settling zone.

Accordingly, an object of our invention is to provide an improved alkylation process and apparatus therefor.

Another object of our invention is to provide an improved process and apparatus for separating the effluent mixture withdrawn from an acid alkylation zone.

Another object of our invention is to provide an improved process and apparatus for reducing to a minimum the emulsion formed at the acid-hydrocarbon interface of an acid alkylation settling zone.

Other objects, advantages and features of our invention will be readily apparent to those skilled in the art from the following description, the drawing and appended claims.

We have discovered that improved separation of the hydrocarbon and acid phases in the settling zone is obtained by introducing an isoparaffin hydrocarbon into the effluent mixture withdrawn from an acid alkylation zone. The isoparaffin reacts with the organic fluorides—emulsion formers—in the effluent mixture, thereby eliminating or reducing to a minimum the emulsion produced at the hydrocarbon-acid interface within the settling zone. Preferably, the isoparaffin introduced into the alkylation zone effluent mixture is at a temperature sufficiently high to warm the effluent mixture passed to the settling zone to a temperature at least as high as about 120° F.

The drawing is a schematic representation of one embodiment of the invention.

The invention is applicable to an alkylation process wherein an olefin is contacted with an isoparaffin in the presence of an acid alkylating catalyst such as hydrofluoric acid, sulfuric acid, or phosphoric acid. The olefin employed in the alkylation process is selected from the group of olefins having 3–5 carbon atoms per molecule or mixtures thereof and the isoparaffin is selected from the group consisting of isobutane and isopentane.

A better understanding of the invention can be obtained by referring to the drawing and the following description of the embodiments illustrated therein. An olefin feed is passed via conduit means 11 to reactor 10 in combination with an isoparaffin passed to conduit means 11 via conduit means 21. Within reactor 10 the olefin and isoparaffin feed is contacted with an alkylation acid catalyst introduced into reactor 10 via conduit means 19. As illustrated in the drawing, recycle acid catalyst is withdrawn from separator 16 via conduit means 24 and passed via conduit means 19 to reactor 10. Makeup catalyst, e.g., from acid rerun, can be introduced into reactor 10 via conduit means 26 and conduit means 19.

Conventional alkylation conditions are maintained within reactor 10. For example, assuming that the olefin feed comprises propylene and butylenes, the isoparaffin alkylating agent comprises isobutane, and the reactant catalyst comprises hydrofluoric acid, the temperature within the alkylation zone is preferably maintained in the range of between about 85–105° F. with the pressure of the alkylation zone sufficient to maintain a liquid phase reaction. As illustrated in the drawing, the temperature within the exothermic alkylation zone is maintained by passing a cooling medium via conduit means 12 to a heat exchange means positioned within reactor 10 and withdrawing the heat exchange medium from reactor 10 via conduit means 13. The volume ratio of acid to hydrocarbon maintained in the alkylation zone is preferably in the range from about 8:1 to 0.1:1, preferably about 1:1.

An alkylation zone effluent mixture comprising hydrocarbon and acid is passed via conduit means 14 to a separator 16 wherein the liquid acid catalyst is separated from the liquid hydrocarbon phase. The pressure range within separator 16 is 150–175 p.s.i.a. An isoparaffin hydrocarbon selected from the group consisting of isobutane and isopentane is introduced into the effluent mixture via conduit means 22. As illustrated in the drawing, the isoparaffin hydrocarbon introduced into the effluent mixture can be the isoparaffin hydrocarbon employed in the alkylation reaction zone. As such, the isoparaffin hydrocarbon is passed via conduit means 21, conduit means 22 and valve means 23 to conduit means 14 wherein the isoparaffin is mixed with the alkylation zone effluent mixture.

When an isoparaffin hydrocarbon such as isohexane, different from that of the isoparaffin hydrocarbon employed in the reaction zone, is introduced into the effluent mixture, the isoparaffin hydrocarbon can be passed via conduit means 29, valve means 30 and conduit means 22 to conduit means 14 wherein the said isoparaffin hydrocarbon is mixed with the alkylation zone effluent mixture.

The isoparaffin hydrocarbon is introduced into the alkylation zone effluent mixture in a quantity sufficient to provide a resultant product mixture wherein the concentration of isoparaffin is greater than in the reaction zone, and wherein the concentration of said isoparaffin introduced into said effluent mixture is normally in the range of at least 10 volume percent to about 50 volume percent of the isoparaffin in said effluent.

Preferably, although not to be limited thereto, the isoparaffin hydrocarbon introduced into the alkylation zone effluent mixture is at a relatively high temperature sufficient to provide a product mixture having a temperature of about 20° F. higher than the reactor temperature, and at least as high as about 120° F. By heating the alkylation zone effluent mixture in the described manner, an increased rate of separation of the hydrocarbon and acid phases is effected within separator 16.

A product hydrocarbon phase containing alkylate and the isoparaffin hydrocarbon introduced into the alkylation zone effluent is withdrawn from separator 16 via conduit means 20. The isoparaffin hydrocarbon can be separated from the alkylate fraction by conventional fractionation steps. When the isoparaffin introduced into the alkylation zone effluent mixture is the isoparaffin hydrocarbon employed in the alkylation zone, the isoparaffin fraction is separated from the alkylate fraction and containing lighter hydrocarbons can be recycled via conduit means 21 and conduit means 11 to reactor 10. When this isoparaffin is used, two stage cooling is effected thereon in the overhead accumulator of the deisoparaffinizer (not shown) to produce one relatively cool stream to go to the reactor, and one relatively warm stream to be injected into the reactor effluent. The isoparaffin added to the reactor effluent can be in vapor form in an amount and at a temperature so that it will condense in the liquid admixture. When the isoparaffin hydrocarbon other than the isoparaffin hydrocarbon employed in reactor 10 is introduced into the alkylation zone effluent mixture, the isoparaffin hydrocarbon can be separated from the alkylate product fraction by fractionation and recycled via conduit means 29, valve means 30 and conduit means 22 to conduit means 14.

In a second embodiment of the invention, a portion of the alkylation zone effluent mixture is recycled via conduit means 17, valve means 18 and conduit means 19 to reactor 10 in combination with the recycled acid phase. Recycle of a portion of the effluent alkylation zone effluent mixture results in increased reaction residence time and increases odorless solvent from about 10 volume percent up to 12 volume percent of the total alkylate product yield. The volume ratio of recycle to reactor effluent is in the range of 1:5 to 1:20.

In a third embodiment of the invention, a portion of the isoparaffin feed to reactor 10 is introduced into that portion of alkylation zone effluent mixture recycled to reactor 10. The isoparaffin hydrocarbon is introduced into recycle alkylation zone effluent mixture via conduit means 21, conduit means 27 and valve means 28. By introducing the isoparaffin hydrocarbon into the recycled alkylation zone effluent mixture, the isoparaffin hydrocarbon will react with the unreacted organic fluorides in the effluent mixture and thus provide a higher yield of alkylate material, particularly the odorless solvent or higher boiling range alkylate. The volume ratio of added isoparaffin to recycled reaction zone effluent is in the range of 1:4 to 1:15. This increases the odorless solvent from about 10 volume percent up to about 14 volume percent of the total alkylate produced.

The following examples are presented to illustrate the objects and advantages of the invention. It is not intended that the invention should be limited to the embodiments illustrated therein.

*Example I*

An alkylation zone effluent mixture at a temperature of 100° F. at a pressure of 160 p.s.i.a., and having the following composition, in barrels/hour: isobutane, 700 or 72.2 volume percent of the hydrocarbon; total alkylate, 170; propane, 20; normal butane, 80; and HF, 1000; is contacted with vaporous isobutane (equivalent to 250 barrels of liquid isobutane) to produce a product mixture wherein the concentration of the said isobutane introduced into the alkylation zone effluent mixture is now 77.8 volume percent of the hydrocarbon. The temperature of the vaporous isobutane introduced into the effluent mixture is 160° F.

The resultant combined mixture is passed to a settling zone maintained at a pressure of 160 p.s.i.a. and at a temperature of 160° F. by external heating means. A residence time of three minutes is required within the settling zone to obtain complete separation of the acid and liquid hydrocarbon phases.

*Example II*

An alkylation zone effluent mixture at a temperature of 100° F., at a pressure of 160 p.s.i.a., and having the following composition, in barrels/hour: isobutane, 700; total alkylate, 170; propane, 20; normal butane, 80; and HF, 1000; is passed to a settling zone maintained at a pressure of 160 p.s.i.a., and at a temperature of 100° F. A residence time of seven minutes is required to obtain a complete separation of the acid and hydrocarbon phases.

A comparison of the results obtained in Examples I and II clearly demonstrate the effectiveness of the invention to reduce the residence time required in the settling zone to obtain a complete separation of the acid and hydrocarbon phases.

*Example III*

The alkylation zone effluent mixture of Example I is contacted with isobutane so as to produce a combined mixture wherein the concentration of the isobutane introduced into the effluent mixture is 77.8 volume percent of the hydrocarbon. The temperature of the isobutane is 100° F., thereby producing a combined mixture having a temperature of 100° F.

The combined mixture is passed to a settling zone. A residence time of five minutes is required to obtain complete separation of the acid and hydrocarbon phases within the settling zone.

A comparison of the results obtained in Examples I and III clearly demonstrates the effectiveness of heating the effluent mixture to aid in the separation of the acid and hydrocarbon phases within the settling zone.

As will be evident to those skilled in the art, various modifications of this invention can be made, or followed, in the light of the foregoing disclosure, without departing from the spirit or scope thereof.

We claim:

1. In an alkylation process which comprises introducing an olefin having 3 to 5 carbon atoms into an alkylation zone containing an acid alkylation catalyst, introducing an isoparaffinic hydrocarbon feed selected from the group consisting of isobutane and isopentane into said alkylation zone, maintaining alkylation conditions within said alkylation zone, passing an effluent mixture from said alkylation zone to a settling zone, withdrawing a hydrocarbon phase from said settling zone, and withdrawing an acid phase from said settling zone; the improvement which comprises introducing an isoparaffinic hydrocarbon selected from the group consisting of isobutane, isopentane, and isohexane into the effluent mixture passed from said alkylation zone to said settling zone, the amount of isoparaffinic hydrocarbon added to said effluent being in the range of about 10 to about 50 volume percent based on isoparaffinic hydrocarbon content in said effluent, and maintaining the temperature of the resulting mixture at least as high as 120° F. thereby achieving faster separation of the acid and hydrocarbon phases in said settling zone.

2. In an alkylation process which comprises introducing an olefin having from 3 to 5 carbon atoms into an alkylation zone containing an acid alkylation catalyst, introducing an isoparaffinic hydrocarbon feed selected from the group consisting of isobutane and isopentane into said alkylation zone, maintaining alkylation conditions within said alkylation zone, passing an effluent mixture from said alkylation zone to a settling zone, withdrawing a hydrocarbon phase from said settling zone, and withdrawing an acid phase from said settling zone; the improvement which comprises introducing an isoparaffinic hydrocarbon selected from the group consisting of isobutane, isopentane, and isohexane into the effluent mixture passed from said alkylation zone to said settling zone, said isoparaffinic hydrocarbon being introduced in the range of about 10 to about 50 volume percent based on isoparaffinic hydrocarbon content in said effluent, said isoparaffinic hydrocarbon being at a temperature above the temperature of the reaction effluent such that the temperature of said effluent is raised by at least 20° F. and is at least as high as 120° F. thereby achieving faster separation of the acid and hydrocarbon phases in said settling zone.

References Cited

UNITED STATES PATENTS

| | | | |
|---|---|---|---|
| 2,493,384 | 1/1950 | Bergen | 360—683.48 |
| 2,717,913 | 9/1955 | Rollman | 260—683.48 X |
| 3,179,712 | 4/1965 | Carsan | 260—683.48 |
| 3,206,524 | 9/1965 | Plaster | 260—683.42 |
| 3,249,650 | 3/1966 | Fenske | 260—683.48 |

OTHER REFERENCES

Uren, Petroleum Production Engineering, 3rd ed., McGraw-Hill, New York, 1953, pp. 573–575.

DELBERT E. GANTZ, *Primary Examiner.*

R. H. SHUBERT, G. J. CRASANAKIS,
*Assistant Examiners.*